United States Patent [19]

Brown-Wensley et al.

[11] Patent Number: 5,296,566

[45] Date of Patent: Mar. 22, 1994

[54] POLYMERIZABLE COMPOSITIONS CONTAINING OLEFIN METATHESIS CATALYSTS AND COCATALYSTS, AND METHODS OF USE THEREFOR

[75] Inventors: Katherine A. Brown-Wensley, Lake Elmo; Michael C. Palazzotto, St. Paul; William M. Lamanna, Stillwater; Larry D. Boardman, Shoreview; John E. Gozum, Woodbury; Fred B. McCormic, Maplewood, all of Minn.

[73] Assignee: Minnesota Mining and Manufacturing Company, St. Paul, Minn.

[21] Appl. No.: 992,381

[22] Filed: Dec. 16, 1992

Related U.S. Application Data

[62] Division of Ser. No. 811,785, Dec. 20, 1991, Pat. No. 5,198,511.

[51] Int. Cl.$^5$ .............................................. C08F 4/80
[52] U.S. Cl. ................................... 526/171; 526/280; 526/281
[58] Field of Search ................. 526/171, 280, 281

[56] References Cited

U.S. PATENT DOCUMENTS

| | | | |
|---|---|---|---|
| 3,367,924 | 2/1968 | Rinehart | 260/89.3 |
| 3,435,016 | 3/1969 | Rinehart | 260/93.1 |
| 3,959,234 | 5/1976 | Kurosawa et al. | 526/281 |
| 4,104,325 | 8/1978 | Ueshima et al. | 526/281 |
| 4,250,063 | 2/1981 | Kotani et al. | 526/113 |
| 4,334,048 | 6/1982 | Katz et al. | 526/170 |
| 4,490,512 | 12/1984 | Katz | 526/75 |
| 4,729,976 | 3/1988 | Sjardijn | 502/102 |
| 4,883,851 | 11/1989 | Grubbs et al. | 526/268 |
| 4,945,141 | 7/1990 | Grubbs et al. | 526/90 |
| 4,945,144 | 7/1990 | Grubbs et al. | 526/268 |
| 4,994,426 | 2/1991 | Sjardijn et al. | 502/158 |
| 5,019,544 | 5/1991 | Bell | 502/102 |

OTHER PUBLICATIONS

Makromol. Chem., vol. 187, No. 3, Mar. 1986, Basel, pp. 619-632.
Tetrahedron Letters, No. 47, 1976, pp. 4247-4250.
Chemical Abstracts, vol. 97, No. 13, Sep. 27, 1982, Abstract No. 109487.
J. Mol. Catal., vol. 15, No. 1-2, 1982, pp. 219-244.
Chem. Abs. 85(14):99786a.
A. Agapiou et al., J. Chem. Soc., Chem. Comm. 1975, 187.
C. Tanielian et al., Tetrahedron Lett., 1977, 52, 4589-4592.
P. Krausz et al., J. Organomet. Chem., 1978, 146, 125-134.
T. Szymanska-Buzar et al., J. Mol. Cat., 1987, 43, 161-170.
K. J. Ivin et al., J. Chem. Soc., Chem. Comm. 1981, 1062-1064.
M. H. Desbois et al., New J. Chem., 1989, 13, 595-600.
S. J. Landon, et al., J. Am. Chem. Soc., 1985 107, 6739-6740.
C. T. Thu et al., Makromol Chem., Rapid Commun., 1981, 2, pp. 383-386.
F. W. Michelotti and J. H. Carter, Polymer Preprints 1965, 6, pp. 224-233.
K. Weiss & R. Goller, J. Mol. Catal., 1986, 36, 39-45.
Z. Foltynowicz et al., J. Mol. Catal. 1991, 65, 113-125.
V. A. Bhanu et al., Chem. Rev. 1991, 91 (2), pp. 99-117.
K. J. Ivin, "Cycloalkenes and Bicycloalkenes," Ch. 3 in K. J. Ivin, T. Saegusa, Eds., Ring-Opening Polymerization, vol. 1, Elsevier, London, 1984 121-183.
L. L. Blosch, K. Abbound, J. M. Boncella, J. Amer. Chem. Soc., 1991, 113, 7066-7068.
R. E. Rinehart and H. P. Smith, J. Polymer. Sci., B (Polymer Letters) 1965, 3, pp. 1049-1052.
F. W. Michelotti and W. P. Keaveney, J. Polym. Sci., A 1965, 3, pp. 895-905.

Primary Examiner—Joseph L. Schofer
Assistant Examiner—David Wu
Attorney, Agent, or Firm—Gary L. Griswold; Walter N. Kirn; Lorraine R. Sherman

[57] ABSTRACT

Polymerization of ring-strained cyclic olefins takes place in the presence of a one-part or two-part catalyst which is air and moisture stable and which comprises a transition metal-containing compound.

(Abstract continued on next page.)

The one-part transition metal-containing catalyst is selected from the group consisting of
(a) compounds of the formula $$(L^1)(L^2)Q$$

wherein

Q represents Mo or W;
$L^1$ represents one to six CO (carbonyl) ligands;
$L^2$ represents none to 5 ligands, each of which is a non-ionic compound or unit of a polymer which can be the same or different, each contributes two, four, or six electrons to the metal and is different from $L^1$; wherein the sum of the valence electrons of Q and the electrons contributed by the ligands $L^1$ and $L^2$ is 18,
(b) at least one of cationic ruthenium and osmium-containing organometallic salts having at least one polyene ligand, and
(c) $[Ir(RO_2CHC=CHCO_2R)_2Cl]_2$ wherein each R independently is hydrogen or lower alkyl ($C_1$ to $C_4$), provided that the oxidation state of the metal is in the range of +3 to 0, and that cocatalysts containing C-halogen bonds are not present.

The two-part catalyst comprises
(a) a transition metal-containing catalyst, provided that the oxidation state of the transition metal is in the range of +3 to 0, and
(b) a cocatalyst selected from the group consisting of
  (i) terminal or silyl alkynes,
  (ii) organosilanes containing at least one of

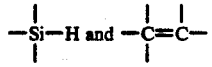

groups,
  (iii) oxidative salts or oxidative compounds containing an oxygen atom to non-oxygen atom double bond, and
  (iv) heteroatom-containing alkenes.

The polymerized composition is useful to provide molded articles, elastomers, dielectric supports, ionophoric or biologically active materials, composite materials, and the like.

18 Claims, No Drawings

POLYMERIZABLE COMPOSITIONS CONTAINING OLEFIN METATHESIS CATALYSTS AND COCATALYSTS, AND METHODS OF USE THEREFOR

This is a division of application Ser. No. 07/811,785 filed Dec. 20, 1991 now U.S. Pat. No. 5,198,511.

FIELD OF THE INVENTION

This invention relates to polymerization of ring-strained cyclic olefins by means of a one-part or two-part catalyst which comprises a transition metal-containing compound. The polymerized composition is useful to provide molded articles, elastomers, dielectric supports, ionophoric, or biologically active materials, and composite materials.

BACKGROUND OF THE INVENTION

It is known in the art that polymerization of cyclic olefins provides unsaturated polymers which were disclosed to be useful, for example, as molded articles.

Polymerization of cyclic olefins via the so-called olefin metathesis reaction has been widely investigated since the first description appeared in 1960. Ivin has reviewed the work in this field (K. J. Ivin, "Cycloalkenes and Bicycloalkenes," Chapter 3 in K. J. Ivin, T. Saecjusa, eds. *Ring-Opening Polymerization*, Vol. 1, Elsevier: London, 1984, 121–183). Polymers produced via olefin metathesis of cyclic olefins still contain

bonds, one for each monomer unit, and are thus distinct from polymers prepared using free radical or Ziegler-type catalysts, which produce saturated hydrocarbon polymers, and polymers prepared using ring-opening polymerizations of cationically sensitive monomers such as epoxides, in which heteroatoms are present and are involved in the polymerization chemistry by cleavage of a heteroatoms-carbon bond.

As this review and many patents teach, certain transition metal compounds can be used to catalyze olefin metathesis polymerization of cyclic olefins. Molybdenum (Mo), tungsten (W), and rhenium (Re), incorporated in either inorganic or organometallic compounds, have most often been employed. Catalysts based on transition metals from Periodic Groups 4, 5, 8, and 9 are also known. Heterogeneous catalysts have been taught, typically supported on alumina or silica. Most useful, however, are homogeneous or non-supported catalysts. The most frequently used homogeneous catalysts are based on high oxidation state compounds of Mo or W, such as $WCl_6$, $WOCl_4$ or $MoCl_6$. Reaction products of these with phenolic compounds are also taught. Cocatalysts, usually containing an alkyl group bonded to a non-transition metal, are often used in combination with these, and cocatalysts are presumed to transfer at least one alkyl group to the transition metal. Most frequently, the cocatalysts are based on aluminum (Al), but alkyls of zinc, tin and other Group 14 metals, Group 1 metals (such as lithium), and Group 2 metals (such as magnesium) are also employed. Cocatalysts which are halogen-containing Lewis acids such as $AlCl_3$ or sources of halide, either organic, organometallic, or inorganic, may be used in combination with the transition metal-containing compound, organic reagents may be added to slow the rate of polymerization; typically these contain Lewis-basic groups, usually containing nitrogen or oxygen. More specialized catalysts, usually organometallic compounds, are also known, and the most widely used of these are based on W or titanium (Ti). As is appreciated by those skilled in the art, all of these systems ate sensitive to water and air, some violently so, and accordingly the usual practice is to remove adventitious amounts of water and air or be limited to processes and compounds in which materials free of these impurities can be supplied to the catalyst. A robust W organometallic compound has recently been described (L. L. Blosch, K. Abbound, J. M. Boncella *J. Amer. Chem. Soc.* 1991, 113, 7066–7068), but it requires the use of water-sensitive $AlCl_3$ as cocatalyst to be active as an olefin metathesis polymerization catalyst. Certain of the above catalysts and cocatalysts may have other disadvantages as well. For example, use of organic sources of halide such as $CCl_4$ is undesirable because such compounds are carcinogenic. Use of alkyltin compounds is undesirable because such materials are known to be toxic to certain organisms and harmful to humans, and they are heavily regulated by such agencies as the U.S. Environmental Protection Agency, particularly with respect to use and disposal. Still other systems require the use of solvents, making them unsuitable for solvent-free processes; solvent-free processes are desirable because they provide environmental and cost advantages.

A smaller body of background art teaches the use of Periodic Groups 8 and 9 transition metal compounds for olefin metathesis, especially compounds containing ruthenium (Ru), osmium (Os), and iridium (Ir). U.S. Pat. Nos. 3,367,924 and 3,435,016 disclose use of Ir halides and R. E. Rinehart and H. P. Smith in *J. Polym. Sci., B* (Polymer Letters) 1965, 3, pp 1049–1052 disclose Ru halides as catalysts for olefin metathesis polymerization of cyclic olefins in inert and protic solvents, including water. F. W. Michelotti and W. P. Keaveney in *J. Polym. Sci: A* 1965, 3, pp 895–905 describe hydrated trichlorides of Ru, Ir and Os as polymerization catalysts in alcohol solvents. F. W. Michelotti and J. H. Carter in *Polymer Preprints* 1965, 6, pp 224–233 describe the use of $IrCl_3 \cdot 3H_2O$ under nitrogen atmosphere to produce polymer in varying yields from functional group-containing norbornenes. Grubbs in U.S. Pat. Nos. 4,883,851, 4,945,144, and 4,945,141 teach Ru and Os compounds as catalysts for polymerization of 7-oxanorbornenes. It is believed that cocatalysts have not been described for Ru, Os, or Ir-containing olefin metathesis polymerization catalysts.

Certain olefin metathesis polymerization cocatalysts which are not sensitive to air or water have been taught; however, they are used in combination with air or water sensitive transition metal compounds, so that the reaction mixture still must be scrubbed of and protected from water or air or both. U.S. Pat. No. 4,490,512 and K. Weiss and R. Goller in *J. Mol. Catal.* 1986, 36, 39–45 disclose ring-opening metathesis of cycloolefins (e.g., cyclopentene or cycloheptene) in the presence of $WCl_6$ and a 1-alkyne to give, for example, poly-1-pentenylene or poly-1-heptenylene, respectively. U.S. Pat. No. 4,334,048 describes the use of acetylenes with air-sensitive W-carbene compound under inert conditions to give low yields of polymer.

Cocatalysts containing silyl hydride

are used with the reaction products obtained from air-sensitive tungsten halide plus a phenolic compound as disclosed in U.S. Pat. No. 4,994,426 for polymerization of substituted norbornenes. A combination of a tungsten compound and a tin-hydride has also been employed in U.S. Pat. Nos. 5,019,544 and 4,729,976. Z. Foltynowicz, B. Marciniec, and C. Pietraszuk in *J. Mol. Catal.* 1991, 65, 113–125 describe reaction of vinyltriethoxysilane as reagent with alkenes in the presence of $RuCl_3$ and $RuCl_2(PPh_3)_3$ (wherein Ph=phenyl), although they do not teach polymerization of cyclic olefins.

Oxidative cocatalysts have been used in various circumstances. For example, oxygen is described as having varying effects upon on olefin metathesis polymerization catalysts by V. A. Bhanu and K. Kishore in *Chem. Rev.* 1991, 91 (2), pp 99–117 (see especially 112–113). In particular, apparent beneficial effects of oxygen ($O_2$) upon Ru-containing compound catalyzed norbornene polymerization reactions are attributed to initial epoxide formation by K. J. Ivin, B. S. R. Reddy, and J. J. Rooney in *J. Chem. Soc., Chem. Comm.* 1981, 1062–1064.

In non-analogous art, the effect of $[Cp_2Fe]^+PF_6^-$ on W-containing catalysts for alkyne polymerization has been described by M.-H. Desbois and D. Astruc in *New J. Chem.* 1989, 13, 595–600. Photoassisted $W(CO)_6$ catalysts for acetylene polymerization have been disclosed by S.J. Landon, P.M. Shulman and G.L. Geoffroy, in *J. Am. Chem. Soc.* 1985 107, 6739–6740.

Heteroatom-containing alkene reagents have been disclosed by C. T. Thu, T. Bastelberger, and H. Hocker in *Makromol. Chem., Rapid Commun.* 1981, 2, pp 383–386. This reference describes the polymerization of a cyclic vinyl ether in the presence of a chromium-carbene compound under nitrogen atmosphere.

All of the transition metal catalyst and cocatalyst systems described in the background art are deficient in that they are either moisture sensitive and/or air sensitive, or they do not teach polymerization of cyclic olefins via olefin metathesis.

Methods employing photolysis for metathesis of olefinic compounds using $W(CO)_6$ in the presence of $CCl_4$ have been disclosed by A. Agapiou and E. McNelis in *J. Chem. Soc., Chem. Comm.* 1975, 187, and by C. Tanielian, R. Kieffer, and A. Harfouch in *Tetrahedron Lett.* 1977, 52, 4589–4592. P. Krausz, F. Garnier, and J. Dubois in *J. Organomet. Chem.*, 1978, 146, 125–134 disclose photoassisted olefin metathesis of trans-2-pentene in the presence Of $W(CO)_6/CCl_4$ to provide a mixture of 2-butene and 3-hexene. No polymers are taught. Certain tungsten-containing compounds and Lewis acid cocatalysts such as $AlCl_3$ or $ZrCl_4$ have also been disclosed by T. Szymanska-Buzar and J.J. Ziolkowski in *J. Mol. Cat.*, 1987, 43, 161–170, for metathesis of linear olefins. No polymerization is taught. All of these systems are deficient in that they are sensitive to air or water, employ halogen-containing cocatalysts, or do not teach the polymerization via olefin metathesis of cyclic olefins.

SUMMARY OF THE INVENTION

The present invention provides polymerizable compositions comprising
 a) at least one ring-strained non-conjugated cyclic olefin, and
 b) a one-part or two-part transition metal-containing catalyst which is air and moisture stable,
wherein
 1) the one-part transition metal-containing catalyst is selected from the group consisting of
 (a) compounds of the formula:

wherein
 Q represents Mo or W;
 $L^1$ represents one to six CO (carbonyl) ligands;
 $L^2$ represents none to 5 ligands, each of which is a non-ionic compound or unit of a polymer which can be the same or different, each contributes two, four, or six electrons to the metal and is different from $L^1$;
 wherein the sum of the valence electrons of Q and the electrons contributed by the ligands $L^1$ and $L^2$ is 18,
 (b) at least one of cationic ruthenium and osmium-containing organometallic salts having at least one polyene ligand, and
 (c) $[Ir(RO_2CHC=CHCO_2R)_2Cl]_2$ wherein each R independently is hydrogen or lower alkyl ($c_1$ to $C_4$), provided that the oxidation state of the metal is in the range of +3 to 0, and that cocatalysts containing C-halogen bonds are not present;
 2) said two-part catalyst comprises
 (a) a transition metal-containing catalyst, provided that the oxidation state of the transition metal is in the range of +3 to 0, and
 (b) a cocatalyst selected from the group consisting of
  (i) terminal or silyl alkynes,
  (ii) organosilanes containing at least one of

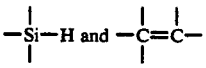

groups,
  (iii) oxidative salts or oxidative compounds containing an oxygen atom to non-oxygen atom double bond, and
  (iv) heteroatoms-containing alkenes.

In another aspect, the present invention provides a is method for polymerizing ring-strained cyclic olefins comprising the steps of:
 a) providing the composition as disclosed above,
 b) allowing said composition to polymerize, optionally in the presence of at least one of actinic radiation and heat.

In yet another aspect, the present invention provides the polymerized composition disclosed above.

In still further aspects, the present invention provides a molded article, self-supported sheet-like article, or a coating on a substrate comprising the polymerized composition previously disclosed.

Advantages of the catalyzed compositions of the present invention over the background art include:
 faster olefin metathesis rates, including shorter induction periods;

improved control over properties of polymers, such as molecular weight;

higher yields of polymers;

improved catalyst solubility;

improved catalyst stability;

greater catalyst activity in the presence of organic functional groups;

greater catalyst activity in the presence of adventitious or added water or air;

a homogeneous composition containing the one-part and two-part catalysts of the invention;

better process control, including the ability to trigger catalyst activity; and adequate reaction rates at lower concentrations of transition metal compound, with derivative advantages such as lower catalyst costs, less residual contamination or color from transition metal, and better control over polymer properties such as molecular weight.

Transition metal compounds and optional cocatalysts of the present invention are not sensitive to water or air. Tolerance of at least adventitious amounts of water or air is a significant advantage in many industrial processes,, obviating the need for expensive purification steps; further, in some processes such purification is not possible. It is also advantageous to be able to manipulate and store transition metal compounds and promoters in humid or dry air. What the background art has not taught that the present invention teaches are catalysts containing transition metal compounds and optionally cocatalysts which are ring-strained cyclic olefin metathesis polymerization catalysts and which are insensitive to water, either adventitious or as solvent or cosolvent, and to air. Further, the catalysts of the present invention are active in the presence of many organic functional groups, notably those containing oxygen (O), sulfur (S), or nitrogen (N) atoms.

In this application:

"ring-strained" means the conversion of monomer to polymer is exothermic, i.e., there is a negative free energy change during conversion of monomer to polymer, as discussed by K. J. Ivin and T. Saegusa in "General Thermodynamic and Mechanistic Aspects of Ring-opening Polymerization," Chapter 1 in K. J. Ivin, T. Saegusa , eds. *Ring-Opening Polymerization*, Vol. 1, Elsevier: London, 1984, pp 1–3;

"actinic radiation" means electromagnetic radiation and electron beam (e-beam);

"homogeneous composition" means that the transition metal catalyst and optional cocatalyst are soluble in at least one phase of the polymerizable composition or in a liquid which will also dissolve the polymerizable composition;

"organometallic" means a group containing at least one carbon to transition metal bond is present;

"oxidation state" is a formalism describing the number of d-shell electrons associated with a transition metal, as discussed by J. P. Collman and L. S. Hegedus in *Principles and Applications of organotransition Metal Chemistry*, University science Books, Mill Valley CA, 1980, 13–19;

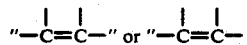

group or "alkenyl" all refer to carbon-to-carbon double bonds.

DETAILED DESCRIPTION OF THE PREFERRED EMBODIMENTS OF INVENTION

Catalysts of the present invention are useful in the synthesis of polymers from cyclic olefins. Optionally, certain classes of cocatalysts may be used in combination with transition metal compounds from Periodic Groups 4–10 (first row elements in Groups 4 to 10 are titanium (Ti), vanadium (V), chromium (Cr), manganese (Mn), iron (Fe), cobalt (Co), nickel (Ni), respectively), to achieve various combinations of the advantages set forth above. Preferred are transition metal compounds selected from Groups 6–10, more preferably Groups 6, 8 or 9. Most preferred are transition metal compounds of W, Ru, and Ir.

The reaction equation for the cyclic olefin metathesis polymerization reaction is shown below.

Reaction Equation

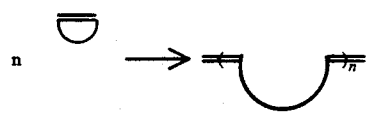

wherein

means a nonconjugated cyclic olefin monomer and

means a ring opened polymerized unit with the same degree of unsaturation as the monomer, and wherein n is from 5 to 50,000. The molecular weight of the polymers can be in the range of 300 to 5 million.

Cyclic olefins useful in compositions of the present invention preferably include ring-strained monocyclic olefins such as cyclobutene, cyclopentene, cycloheptene, and cyclooctene, optionally substituted with up to four saturated or unsaturated hydrocarbyl, alkaryl, aralkyl or aryl groups, in which "alkyl" or "alk" or "hydrocarbyl" may be linear, branched, or cyclic, each group containing up to thirty carbon atoms, up to sixty halogen atoms, and up to four heteroatoms selected from non-peroxidic O, N, and Si, which may be combined to form functional groups or linkages including ether, alcohol, ketone, aldehyde, carboxylic acid, ester, amide, amino, cyano, anhydride, and the like. Also preferable are polycyclic mono- or diolefins such as norbornene, norbornadiene, and dicyclopentadiene, and oligomers thereof, and heteroatoms-containing polycyclic olefins such as 7-oxanorbornene, optionally substituted with up to four saturated or unsaturated hydrocarbyl, alkaryl, aralkyl, or aryl groups, in which "alkyl" or "alk" or "hydrocarbyl" may be linear, branched, or cyclic, each group containing up to thirty carbon atoms, up to sixty halogen atoms, and up to four heteroatoms selected from non-peroxidic oxygen (O), nitrogen (N), and silicon (Si), which may be combined to form functional groups or linkages including ether, alcohol, ketone, aldehyde, carboxylic acid, ester, amide, amino, cyano, anhydride, and the like. In the case of substituted norbornene and dicyclopentadiene, endo or exo or syn or anti or combinations of any of these isomers are suitable. Other examples of suitable monomers include norbornene, 5-methyl-2-norbornene, 5-ethyl-2-norbornene, 7-methyl-2-norbornene, 1-methyl-2-norbornene, 5,6-dimethyl-2-norbornene, 5-norbornene-2-carbonitrile, 5-norbornene-2-carboxaldehyde, 5-norbornene-2,3-dicarboxylic acid, diethyl 5-norbornene-2,3-dicarboxylate, dimethyl 5-norbornene-2,3-dicarboxylate, 5-norbornene-2,3-dicarboxylic anhydride, 5-norbornene-2,2-dimethanol, 5-norbornene-2-methanol, 5-norbornen-2-ol, 2-acetyl-5-norbornene, 5-norbornen-2-yl acetate, 2-benzoyl-5-norbornene, 5-vinyl-2-norbornene, 5-methylene-2-norbornene, 5-norbornene-2-methanol acrylate, 5-[2-(trimethylsilyl)ethyl)-2-norbornene, 5-[2-(pentamethyldisiloxy)ethyl]-2-norbornene, 5-chloromethyl-2-norbornene, 2,3-di(chloromethyl)-5-norbornene, 5-trifluoromethyl-2-norbornene, and 2,3,3-trifluoro-2-trifluoromethyl-5-norbornene. Other suitable monomers are described in U.S. Pat. Nos. 5,011,730, 4,994,535, 4,945,144, 4,943,621, 4,923,943, 4,923,936, and 4,250,063 which are incorporated herein by reference. All these materials are commercially available (e.g., many from Aldrich Chemical Co., Milwaukee, WI) or their preparation is described in the chemical literature; 5-[2-(trimethylsilyl)ethyl]-2-norbornene and 5-[2-(pentamethyldisiloxy)ethyl]-2-norbornene are prepared by the reaction of 5-vinyl-2-norbornene with trimethylsilane or pentamethyldisiloxane, respectively, using published procedures and platinum-containing catalysts for hydrosilation of alkenes (see D. A. Armitage, "Organosilanes," Chapter 9.1 in G. Wilkinson, F.G.A. Stone, and E.W. Abel, eds., *Comprehensive organometallic Chemistry*, Vol. 2, Pergamon Press, Oxford, 1982, 117–120). Preferably, at least one of the cyclic olefins of the present invention is polycyclic, more preferably it is norbornene or substituted norbornene or dicyclopentadiene, or substituted dicyclopentadiene.

The one-part and two-part homogeneous catalysts of the present invention can include the following:

For the one-part catalysts $(L^1)(L^2)Q$ wherein $L^1$, $L^2$, and Q are as defined above, and which preferably has the formula $Q(CO)_6$, wherein Q can be W or Mo, and substituted derivatives thereof; cationic organometallic Ru-containing or Os-containing compounds having at least one polyene ligand; and $[Ir(RO_2CHC=CH-CO_2R)_2Cl]_2$, all are effective thermal or photoactivated catalysts for olefin metathesis polymerization of ring-strained olefins. Preferably the oxidation state of the transition metal is in the range of +3 to 0, more preferably +2 to 0, and preferably the composition is free of cocatalysts containing C-halogen bonds, especially $CCl_4$ and $CHCl_3$.

In the one-part transition metal-containing catalyst having the formula $(L^1)(L^2)(Q)$, ligands $L^1$ and $L^2$ are well known in the art of transition metal organometallic compounds. Ligands $L^1$ to $L^2$ are neutral, stable compounds, and each contributes an even number of electrons to the metal Q, which can be Mo or W. Ligands $L^1$ to $L^2$ are stable non-ionic compounds or polymeric units in and of themselves (they are not salts, groups, radicals or fragments) and can exist independently of the organometallic compound without special conditions, and they are stable at room temperature.

Ligand $L^1$ is only carbonyl, CO.

Ligands $L^2$ are provided by monodentate and polydentate compounds (preferably containing up to about 30 carbon atoms and up to 10 hetero atoms selected from nitrogen, sulfur, non-peroxidic oxygen, phosphorus, arsenic, selenium, antimony, and tellurium). Examples of suitable monodentate compounds or groups are carbon sulfide, carbon selenide, carbon telluride, alcohols such as ethanol, butanol, and phenol; ethers such as tetrahydrofuran; compounds of Group VA elements such as ammonia, phosphine, trimethylamine, trimethylphosphine, triphenylamine, triphenylphosphine, triphenylstilbine, triphenylarsine, tributylphosphite; isonitriles such as phenylisonitrile, butylisonitrile; olefinic compounds such as ethylene, acetylene, propylene, methylacetylene, 1-butene, 2-butene, diacetylene, 1,2-dimethylacetylene, cyclobutene, pentene, norbornene, cyclopentene, hexene, cyclohexene, cycloheptene, 1-octene, 4-octene, 3,4-dimethyl-3-hexene, 1-decene, 1-dodecene;

suitable polydentate compounds or groups include 1,2-bis(diphenylphosphino)ethane, 1,2-bis(diphenylarsino)ethane, bis(diphenylphosphino)methane, ethylenediamine, propylenediamine, diethylenetriamine, hydridotripyrrazolyborate, butadiene, norbornadiene, 1,3-cyclohexadiene, cyclopentadiene, and 1,4-cyclohexadiene.

The ligand $L^2$ can be a unit of a polymer, for example the coordinating amino group in poly(ethyleneamine); the coordinating phosphino group in poly(4-vinylphenyldiphenylphosphine); and the coordinating isonitrile group in poly(4-vinylphenylisonitrile). Polymers having a weight average molecular weight up to 1,000,000 or more can be used. It is preferable that 5 to 50 percent of the coordinating groups present in the polymer be complexed with the metal.

Further illustrative of ligand $L^2$ are substituted and unsubstituted cycloheptatriene, cyclooctatetraene, benzene, toluene, xylenes, mesitylene, hexamethylbenzene, fluorene, naphthalene, anthracene, perylene, chrysene, pyrene, triphenylmethane and carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, antimony, tellurium, silicon, germanium, and tin.

The ligand $L^2$ can be a unit of a polymer, for example, the phenyl group in polystyrene, poly(styrene-co-butadiene), poly(styrene-co-methyl methacrylate), poly(alpha-methylstyrene), polyvinylcarbazole, and polymethylphenylsiloxane; the cyclopentadiene group in poly(vinylcyclopentadiene), etc. Polymers having a weight average molecular weight up to 1,000,000 or more can be used. It is preferable that 5 to 50 percent of the unsaturated or aromatic groups present in the polymer be complexed with the metal.

Each of the ligands $L^2$ can be substituted by groups that do not interfere with the complexing of the ligand with the metal atom. Examples of substituting groups, all of which preferably have less than 30 carbon atoms and up to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, and cyclohexanecarbonyloxy; hydrocarbylcarbonamido, e.g., acetamido, benzamido; azo, boryl; halo, e.g., chloro, iodo, bromo, and fluoro; hydroxy; cyano; nitro; nitroso, oxo; dimethylamino; diphenylphosphino, diphenylarsino; diphenylstibine; trimethylgermane; tributyltin; methylseleno; ethyltelluro; and trimethylsiloxy; condensed rings such as benzo, cyclopenta; naphtho, indeno; and the like.

Preferably, the one-part catalyst containing mo or w is $Mo(CO)_6$, $Mo(CO)_4$(norbornadiene), $W(CO)_6$, and (mesitylene)$W(CO)_3$.

The cationic ruthenium and osmium organometallic compounds which can be the one-part catalyst of this invention contain at least one cyclic or acyclic polyene ligand directly bonded to the Ru or Os atom. Preferably, the polyene ligand is benzene or an aromatic benzene derivative such as cymene.

One representative group of ruthenium and osmium cations of this invention are of the formula $(Ar)M(N\equiv CR^3)_2X^+$ where Ar is benzene or any of the alkyl, ether, or format substituted benzenes such as toluene, ortho-, meta-, or pars-xylene, mesitylene, ortho-, meta-, or para-cymene, durene, isodurene, hexamethylbenzene, pentamethylbenzene, cumene, pseudocumene, prehnitene, triethylbenzene, anisole, methyl 2-methylbenzoate, ethyl benzoate, or 2-, 3-, or 4-methylanisole; M is ruthenium or osmium; R3 is a linear branched hydrocarbon chain with 1 to 30 carbon atoms; and X is a halogen chosen from Cl, Br, or I. These ruthenium and osmium cations are derived from [(Ar)RuX_2]_2 (prepared by the method described by M. A. Bennett and A. K. Smith in *J. Chem. Soc., Dalton Trans.* 1974, pp 233-241) or [(Ar)OSX_2]_2 (prepared by the methods described by J. A. Cabeza and P. M. Maitlis in *J. Chem. Soc., Dalton Trans.* 1985, pp 573-578 and M. Brown, X. L. R. Fontaine, N. N. Greenwood and J. D. Kennedy in *J. Organomet. Chem.* 1987, 325, pp 233-246) where Ar and X are the same as described above. Suitable counterions include $PF_6^-$, $AsF_6^-$, $BF_4^-$, $SbF_6^-$, and the like. Suitable halogen abstracting reagents include $AgBF_4$, $KAsF_6$, $TlPF_6$, $LiBF_4$, $NH_4PF_6$, and the like.

Another group of ruthenium and osmium cations of this invention are of the formula $(Ar)M(Py)_2X^+$ where Ar, M, and X are as described above and Py is pyridine or a substituted pyridine such as 2-, 3-, or 4-acetylpyridine, 2-, 3-, or 4-benzylpyridine, 3,4-lutidine, 3,5-lutidine, 2-, 3-, or 4-bromopyridine, 2-, 3-, or 4-ethylpyridine, 3-, or 4-phenylpyridine, and the like. These complexes may be prepared by the methods described by T. Arthur and T. A. Stephenson in *J. Organomet. Chem.* 1981, 208, pp 369-387.

Also useful in this invention is another group of ruthenium and osmium cations of the formula $(Ar)M-(\mu-Y)_3-M(Ar)^+$ where each Ar is independently defined the same as for Ar above; each M may be the same or different but is Ru or Os; and Y is chosen from the group consisting of Cl, Br, I, H, OH, and $ER^4$ where $R^4$ is a linear or branched hydrocarbon chain with 1 to 30 carbon atoms or an aromatic group containing 6 to 20 carbon atoms and E is oxygen (O) or sulfur (S). The three Y groups bridge the m atoms and there is no M bond, further, the three Y groups need not be identical but may consist of a combination Cl, Br, I, H, OH, and $ER^4$ groups. A variety of synthetic routes to these complexes exists in the literature and are summarized by H. Le Bozec, D. Touchard, and P. H. Dixneuf in *Adv. Organomet. Chem.* 1989, 29, pp 163-247.

Counterions are required in all the cationic ruthenium and osmium organometallic compounds containing at least one cyclic or acyclic polyene ligand directly bonded to the Ru i or Os and representative counterions include $PF_6^-$, $AsF_6^-$, $BF_4^-$, $SbF_6^-$, and the like.

Other ruthenium and osmium compounds, both neutral and cationic, are of use in the present invention and include $(Ar)OsX_2(N\equiv CR^3)$, $[(CHT)RuX_2]_2$, $(CHT)RuCl(CH_3CN)_2^{+1}$, $(Ar)Ru(CH_3CN)_3^{+2}$, $CpRu(CH_3CN)_3^{+1}$, $[(COD)RuX_2]_x$, $(COD)RuX(CH_3CN)_3^+$, $(Ar)RuCl(allyl)$, $(COD)RuX_2(CH_3CN)(CO)$, $(diene)RuCl_2(amine)_2$, $CpRu(diene)Cl$, $[CpRu(Cl)_2]_x$, $[Cp^*Ru(Cl)_2]_x$, $[(1-3-\eta:6-8-\eta)-2,7-dimethyloctadienediyl)RuCl_2]_2$ and the like where Ar, X, and $R^3$ are as defined above; CHT is cycloheptatriene; COD is 1,5-cyclooctadiene; Cp is $eta^5$-cyclopentadienyl; $Cp^*$ is pentamethylcyclopentadienyl; diene is a cyclic or acyclic hydrocarbon containing 4 to 30 carbon atoms further containing two carbon-to-carbon double bonds; amine is primary, secondary or tertiary aliphatic amine, and allyl is the eta-3 bound

ligand or any of its derivatives.

The two-part catalyst comprises (a) a transition metal-containing catalyst, provided that the oxidation state of the transition metal is in the range +3 to 0, preferably +2 to 0, (b) a cocatalyst selenited from the group consisting of (i) terminal and silyl alkynes (e.g., $-C\equiv C-H$ or $-C\equiv C-Si(R^1)_3$, wherein $R^1$ is defined below), preferably a terminal alkyne, most preferably phenylacetylene, (ii) organosilanes containing at least one of

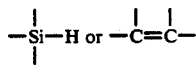

groups, preferably

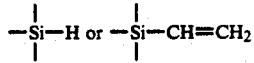

groups, (iii) oxidative salts or oxidative compounds containing an oxygen to non-oxygen double bond, (iv) heteroatoms-containing alkenes, preferably enamines, vinyl ethers, or vinyl thioethers, and more preferably vinyl ethers.

The four two-part catalysts are designated classes I to IV as follows:

I. Transition metal compound plus terminal alkyne cocatalyst:

Preferably, the transition metal compound to be used in combination with an alkyne cocatalyst can be selected from Periodic Groups 6 to 9 compounds, more preferably compounds containing Mo, W, Ru or Ir. Most preferably, it is free of metal-carbon multiple bonds.

The alkyne cocatalyst can be represented by Formula I.

$$R^1C{\equiv}CR^2 \qquad \text{I}$$

where $R^1$ is hydrogen, or saturated or unsaturated hydrocarbyl, alkaryl, aralkyl, aryl, perfluoroalkyl, perfluoroaryl, or silyl group, all of these groups containing up to 30 carbon atoms and up to four heteroatoms selected from O, N, and Si, and $R^2$ is hydrogen (H) or silyl (i.e., $-Si(R^1)_3$, wherein $R^1$ is as defined above). Preferably $R^2$ is H and these compounds are known as terminal alkynes. Illustrative examples of such terminal alkynes include acetylene, phenylacetylene, 1-hexyne, 1-octyne, 3,3-dimethyl-1-butyne, 2-methyl-1-buten-3-yne, 1,7-octadiyne, propargyl chloride, propargyl alcohol, methyl propargyl ether, 3-methoxy-3-methyl-1-butyne, 1-methoxy-1-buten-3-yne, 2-methyl-3-butyn-2-ol, 1-ethynylcyclohexylamine, mono-propargylamine, 1-dimethylamino-2-propyne, tripropargylamine, 3-butyne-2-one, propiolic acid, methyl propiolate, bromoacetylene, trimethylsilylacetylene, and 3,3,3-trifluoropropyne. Examples of silyl alkynes are 1-trimethylsilyl-1-propyne, bis-trimethylsilylacetylene, and ethyl 3-(trimethylsilyl)-1-propynoate. These compounds are commercially available or are described in the chemical literature.

The combination of transition metal compounds and terminal alkyne cocatalysts of this invention can provide faster rates df olefin metathesis polymerization, shorter induction periods and higher polymer yields than the corresponding systems containing no cocatalyst.

II. Transition metal compound plus organosilane containing

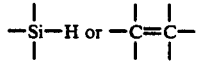

group cocatalyst:

Preferably, the transition metal compound to be used in combination with the organosilane cocatalyst is selected from Groups 6 to 9, more preferably Ru and Ir, most preferably Ir.

Organosilane cocatalysts of the present invention are compounds containing from 1 to 20 silicon atoms, containing up to 100 carbon atoms and optionally containing up to 20 heteroatoms selected from non-peroxidic O and N, and further containing at least one of silyl hydride

and silyl alkenyl, the alkenyl group containing up to 12 carbon atoms and incorporating at least one

bond. The silyl alkenyl group preferably is silyl vinyl, i.e.,

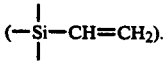

The organosilane may also contain other carbon-containing groups including halogenated and non-halogenated alkyl, alkaryl, aralkyl, and aryl groups having up to 30 carbon atoms, 60 halo atoms, and 4 heteroatoms selected from O, N, and Si, such as methyl, ethyl, hexyl, octadecyl, cyclohexyl, phenyl, 4-methylphenyl, phenylethyl, 3,3,3-trifluoropropyl, and 4-chlorophenyl. organosilane cocatalysts suitable for the practice of the present invention containing at least one Si-H group include triethylsilane, diethylsilane, phenyldimethylsilane, phenylmethylsilane, phenylsilane, pentamethyldisiloxane, 1,1,3,3-tetramethyldisiloxane, 1,1,1,3,3,5,5-heptamethyltrisiloxane, 1,1,1,3,5,5,5-heptamethyltrisiloxane, and 1,1,3,3,5,5-hexamethyltrisiloxane. Organosilicon cocatalysts suitable for the practice of the present invention containing at least one silylalkenyl group include vinyltrimethylsilane, tetravinylsilane 1,3-divinyltetramethyldisiloxane, 1,3-bis(5-hexenyl)tetramethyldisiloxane, and 1,3,5,7-tetravinyltetramethylcyclotetrasiloxane. These compounds are commercially available or can be synthesized as described below.

The use of organosilane cocatalyst can provide advantages such as increased catalyst activity, shorter induction periods, and in particular greater catalyst solubility in polymerizable compositions and more stable catalysts and catalyst solutions.

In a further aspect, organosilane cocatalyst, when used in amounts ranging from 0.5 to 1000 moles, preferably 0.5 to 100, per mole of transition metal compound in a reaction mixture containing polymerizable cyclic olefin, can also provide improved control over molecular weight of the resulting polymer, that is, molecular weights are lower than in the absence of organosilane. Lower molecular weights can be desirable; in particular, solutions of very high molecular weight polymer can be very viscous and difficult to process.

III. Transition metal compound plus oxidative cocatalyst:

Preferably, the transition metal compound to be used in combination with an oxidative cocatalyst is selected from compounds containing Groups 6 to 9 transition metals, more preferably compounds wherein the metal can be Mo, W, Ru or Ir.

Oxidative cocatalysts of the present invention can be inorganic, organometallic or organic. They are selected from oxidative salts and compounds containing at least one oxygen to non-oxygen double bond.

Oxidative salts useful as cocatalysts in the present invention are cationic salts, with the further provision that the counteranion of the salt cannot be a single halogen atom. Examples of cations suitable in the present invention include $Ag^+$, $Na^+$, $Cu^{+2}$, $Zn^{+2}$, $Cp_2Fe^+$ (Cp is eta$^5$-cyclopentadienyl; this cation is called ferricinium), $Ph_3C^+$ (trityl), and tris (4-bromophenyl) aminium, $Ph_2I^+$ (wherein Ph =phenyl) $Tl^+$, $No^+$, $No^+$, $Ph_3S^+$, $Cu^+$, tropylium, and the like. Preferred cations are $Ag^+$, $Cp_2Fe^+$, trityl and tris(4-bromophenyl)aminium. Suitable counteranions include $PF_6^-$, $SbF_6^-$, $AsF_6^-$, $BPh_4$, $BF_4^-$, $SbCl_6^-$, and the like.

Representative examples of oxidative salts which are commercially available or are described in the chemical literature include: $Ag^+BF_4^-$, $Ag^+PF_6^-$, $Ag^+SbF_6^-$, $Ag^+AsF_6^-$, $Na^+PF_6^-$, $Na^+SbF_6^-$, $Zn^{+2}(BF_4^-)_2$, $Cp_2Fe^+PF_6^-$, $Ph_3C^+PF_6^-$, tris(-4-bromophenyl)aminium$^+SbF_6^-$, $Ph_2I^+SbF_6^-$, and the like. Preferred oxidative salts are those used in Examples 8 to 11, below.

Suitable examples of oxidative cocatalysts containing oxygen to non-oxygen double bonds are iodosobenzene, trimethylamine oxide, benzophenone, 1,4-benzoquinone, and the like. $O_2$ gas is not included within this class of cocatalysts, further, the concentration and presence of $O_2$ are difficult to control, and undesirable side reactions may occur if $O_2$ is present in high concentrations such as might be achieved when it is deliberately bubbled through a reaction mixture.

Oxidative cocatalysts useful in the present invention are commercially available or are described in the chemical literature.

Oxidative cocatalysts of the present invention can provide advantages in terms of faster metathesis rates, reduced induction periods, better yields, and, in particular, better tolerance of organic functional groups which may be present as groups on the cyclic olefin monomer or as groups on other additives to the reaction mixture, such as solvents.

The term "oxidative" cocatalyst is used because, while not wishing to be bound by theory, we believe that this class of cocatalysts functions by oxidizing the transition metal compound or materials derived therefrom, including transition metal compounds formed in the presence of olefin, in one or more steps. Oxidation is used here to refer to any process which removes at least one of electrons, atoms or groups from a transition metal compound, thereby leaving the transition metal compound in a configuration with fewer electrons. The formalisms for determining electron configuration, that is oxidation state and coordination number, are described by J. P. Collman and L. S. Hegedus in *Principles and Applications of organotransition Metal Chemistry*, University Science Books, Mill Valley CA, 1980, 13–19, and are well known to those skilled in the art.

IV. Transition metal compound plus heteroatomcontaining alkene:

Preferably, the transition metal compound to be used in combination with a heteroatoms-containing alkene is selected from compounds containing Groups 6 to 9 metals, more preferably Mo, W, Ru, or Ir.

Effective cocatalysts of this class, which are commercially available are described in the chemical literature, include heteroatom substituted linear, branched or cyclic alkenes having up to 30 carbon atoms wherein the heteroatoms are alpha to the olefinic unsaturation and are selected from nitrogen, non-peroxidic oxygen, and sulfur, preferably nitrogen and non-peroxidic oxygen, most preferably non-peroxidic oxygen. Optionally, these compounds may contain up to 10 aryl groups, each of which may contain up to 20 carbon atoms and 4 heteroatoms. Olefinic compounds with heteroatom substitution in positions other than the alpha position are also considered cocatalysts of the present invention if they are able to undergo isomerization in the presence of transition metal olefin metathesis catalysts to give olefins with heteroatoms in the alpha position. Olefin isomerization in the presence of transition metal compounds is well known to those skilled in the art.

For olefins with nitrogen as the alpha heteroatom, the nitrogen is amino-type nitrogen. These olefins belong to the group of compounds referred to as enamines and contain the

group. Illustrative examples of enamines include 2-pyrroline, pyrrole, 1-pyrrolidino-i-cyclohexene, 1-pyrrolidino-1-cyclopentene, 1-morpholino-1-cyclohexene, and the like.

For olefins with oxygen as the alpha heteroatomic group, the oxygen is a non-peroxidic, ether-type oxygen. These olefins belong to the group of compounds referred to as vinyl ethers and contain the

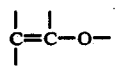

group. Illustrative examples of vinyl ethers include 3,4-dihydro-2H-pyran, 2,3-dihydrofuran, furan, 5,6-dihydro-4-methoxy-2H-pyran, 3,4-dihydro-2-methoxy-2H-pyran, methyl vinyl ether, ethyl vinyl ether, n-butyl vinyl ether, t-butyl vinyl ether.

For olefins with sulfur as the alpha heteroatom, the sulfur is a divalent thioether-type sulfur. These olefins belong to the group of compounds referred to as vinyl thioethers and contain the

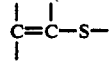

group. Illustrative examples of vinyl thioethers include thiophene, 2-methylthiophene, 3-methylthiophene, 1,2-dihydrothiophene, vinyl methyl sulfide, vinyl butyl sulfide.

For non-alpha heteroatomic group substituted olefins, the heteroatomic groups are the same as those specified above. These olefins are capable of rearrangement to alpha heteroatomic group substituted olefins in the presence of transition metal olefin metathesis catalysts. Thus 7-oxanorbornene (7-oxabicyclo[2.2.]hept-5-ene), an allyl ether, would not be considered a cocatalyst of the present invention as the bridgehead carbons preclude isomerization to the vinyl ether structure. Illustrative examples of non-alpha heteroatomic group substituted olefins that are cocatalysts of the present invention include 2,5-dihydrofuran, 1,3-dioxep-5-ene, 3-pyrroline, allyl sulfide, allylamine, allylcyclohexylamine, allyl ether, allyl ethyl ether, allyl methyl sulfide, allyl propyl ether.

Compositions comprising a transition metal compound and a heteroatom-containing alkene can provide advantages such a.s faster rates of olefin metathesis polymerization, shorter induction periods, and higher yields of polymer.

The polymerizable composition comprising a transition metal compound, an optional cocatalyst, and a monomer may further contain compounds containing organic functional groups such as alcohol, anhydride, carboxylic acid, ether, aromatic ring, ketone, ester, cyano, amide, amine, phosphine, sulfide, thiol, and the like; such compounds may be naturally occurring or present as impurities, or may have been deliberately added to one of the components such as a solvent, stabilizer, antioxidant, pH adjuster, colorant, pigment or dye, filler, flow agent, plasticizer, tackifier, emulsifier, and the like. Nonreactive solvents may optionally be employed, and these may contain functional groups as described above. These optionally present adjuvants can be present in an amount up to 90 percent by weight, preferably up to 50 percent by weight.

Transition metal compounds may be employed in amounts ranging from 0.0001 to 10 percent by weight of the total polymerizable composition, preferably 0.0005 to 5 percent, most preferably 0.0005 to 2 percent.

Optionally, cocatalysts of the present invention may be added. Cocatalysts may be present in amounts ranging from 0.001 to 1000 mole per mole of transition metal-containing compound, preferably 0.01 to 100 mole, most preferably 0.1 to 10 mole, provided that the total amount of transition metal compound and cocatalyst do not exceed .20 percent by weight of the total polymerizable composition, preferably the cocatalyst does not exceed 5 percent, most preferably not to exceed 2 percent.

In preparing compositions of the present invention, transition metal-containing compounds, monomers, optional cocatalysts, and any optional adjuvants may be mixed in any order. Olefin metathesis may proceed at temperatures ranging from approximately $-78°$ to $400°$ C., preferably $0°$ to $300°$ C., most preferably $15°-150°$ C. Those skilled in the art will recognize that faster reaction rates may be obtained at higher temperatures, so long as the catalyst does not thermally decompose under the reaction conditions. The method may optionally employ activation by photolysis, that is, faster rates or improved yields or other advantages may be achieved by irradiation of one or more of the components of the reactive mixture, in any combination and in any order relative to the rest of the process. Specific advantages of methods employing photolysis will be discussed below. A two-stage process, photolysis followed by heating, may be preferred.

In a preferred embodiment, with polymerizable compositions employing the one-part catalyst disclosed above, actinic radiation may be employed to improve catalyst activity. No cocatalyst is required, in contrast to photoactivated olefin metathesis catalysts of the background art which require a halogen-containing cocatalyst such as carbon tetrachloride, $AlCl_3$ or $ZrCl_4$. The present invention compositions are free of these compounds. Transition metal compounds of the present invention preferably possess a photochemically labile ligand. Photochemically labile ligands suitable in the practice of the present invention include carbon monoxide, azide, nitriles, oxalate, arenes, olefins, dihydrogen, phosphines, phosphites, and the like. Other photolabile groups will be apparent to those skilled in the art. Preferred photolabile ligands include carbon monoxide, arenes, nitriles, and olefins and diolefins such as cyclooctadiene, norbornadiene, and ethylene. Useful compounds containing these ligands are commercially available or are described in the chemical literature.

Compositions and methods of the present invention, which employ actinic radiation can provide advantages such as faster rates of polymerization. The production of more active catalysts upon photolysis is particularly advantageous, providing substantial improvements in process control based upon the ability to trigger catalyst activity. That is, a reaction mixture can be prepared and maintained in an unpolymerized state so long as it is protected from actinic radiation, and can then be caused to polymerize at a desired time or place in a process by irradiation. The process requirements and advantages of photogenerated catalysts are apparent to those skilled in the art.

In another embodiment, the methods for polymerizing the compositions of the present invention described above may employ heat.

Optionally, cocatalysts may be used with thermal or photochemically active transition metal compounds to provide improved catalyst reactivity or performance.

Polymers formed via olefin metathesis polymerization of cyclic monomers are useful as molded articles, elastomers, dielectric supports, ionophoric or biologically active materials, composite materials, coated articles, and the like. The polymerizable or polymerized compositions can be coated by means known in the art onto supports such as polymers, paper, metals, glass, and ceramics.

Objects and advantages of this invention are further illustrated by the following examples, but the particular materials and amounts thereof recited in these examples, as well as other conditions and details should not be construed to unduly limit this invention.

EXAMPLES

Throughout these examples, the following abbreviations are used:
NB = norbornylene (bicyclo[2.2.]hept-2-ene)
NBD = norbornadiene
GBL = gamma-butyrolactone
Ru-1 = $[(C_6H_6)Ru(CH_3CN)_2Cl]^+PF_6^-$
Ir-1 = $[Ir(COD)Cl]_2$
Ir-2 = commercial $[Ir(cyclooctene)_2Cl]_2$
Ir-3 = $Ir(CO)_2(acac)$
Cp = $eta^5$-cyclopentadienyl
Cp* = pentamethylcyclopentadienyl
COD = 1,5-cyclooctadiene
acac = acetylacetonate
cat = catalyst
cocat = cocatalyst
samp = sample
Me = methyl
Et = ethyl
Bu = butyl
Ph = phenyl
NM = not measured Except as noted, all materials used in these examples are available from Aldrich Chemical Company, Milwaukee, WI. $N_2O$ was obtained from Matheson Gas Products, East Rutherford, NJ. All organosilane cocatalysts and 3-trimethylsilylcyclopentene are available from Petrarch Systems, Bristol, PA. Ir-1 and Ir-3 are available from Strem Chemicals, Inc., Newburyport, MA. Iodosobenzene is available from Pfaltz and Bauer, Inc., Waterbury, CT. Cyclohexylacetylene is available from Fluka Chemical Corp., Ronkonkoma, NY. $CU(BF_4)_2$ (45% in H is available from Allied Chemical, Morristown, NJ.

$Cp_2Fe^+PF_6^-$ can be prepared by methods found in the chemical literature, such as J. C. Smart, B. L. Pinsky, *J. Amer. Chem. Soc.* 1980, 102, 1009–1015.

Preparation of 1,3-bis(5-hexenyl)tetramethyldisiloxane was as follows: A 1-L 3-necked round bottom flask equipped for magnetic stirring and fitted with a thermometer, a reflux condensor, and an addition funnel was flushed with nitrogen and charged with 297.9 g of 1,5-hexadiene and approximately 30 mg of a 15 wt t solution of platinum(O) in 1,3-divinyl-1,1,3,3-tetramethyldisiloxane. The addition funnel was charged with 218.3 g of 1,1,3,3-tetramethyldisiloxane. The flask and its contents were warmed to a temperature of 60° C., and the 1,1,3,3-tetramethyldisiloxane was added dropwise with stirring over a period of 6 hours. After the addition was complete, the reaction mixture was maintained at 60° C. for an additional 1 hour. Approximately 2 g of acrylonitrile and .2 g of activated carbon were added to complex the platinum catalyst, and the mixture was cooled to room temperature and stirred overnight. The reaction mixture was filtered, and distillation of the filtrate yielded 133.9 g (34%) of the desired product (bp 77°–78° C., 0.07 Mm) as a clear, colorless liquid.

Solvents used were reagent or spectroscopic grade, and were used without further purification. All commercially available materials were used without further purification. [Ir(cyclooctene)$_2$Cl]$_2$ is labeled as "air sensitive" but was handled and stored in air after it was received.

Note that all the monomers, catalysts, cocatalysts, and solvents can be manipulated and used in air without incident or disadvantage. Also note that moisture and air were not removed from polymerizable compositions, or else air was removed only partially (as noted), although the transition metal compounds and optional cocatalysts were also active in the rigorous absence of water and air.

Various Procedures were employed for reactions. Throughout the examples, these Procedures are as follows:

Procedure 1

Transition metal compound, in the amount specified, typically 1 to 50 mg, as a solid or solution as specified, was placed in a reaction vessel in air. Cocatalyst, used as specified, was added. A solution of cyclic monomer, which was norbornene unless otherwise specified, 254 by weight in solvent, in the amount specified, was then added, and the time to form a polymer was measured from the time of addition of monomer. All times are reported in minutes, unless otherwise specified.

The reaction was allowed to proceed at ambient temperature (20°–25° C.) and in ambient light (room light). Polymer formation was indicated by one of three methods, as follows:

1-A: when the specified solvent dissolved norbornene but was a poor solvent for polynorbornene formed via olefin metathesis, polymer was initially observed by a cloudy appearance, followed by formation of polymer precipitate. Such solvents included ethanol, petroleum ether, and ethyl acetate.

1-B: when the specified solvent dissolved norbornene and was a good solvent for polynorbornene formed via olefin metathesis, and the reaction was sufficiently slow, formation of polymer was detected by removing a small aliquot (several drops) of reaction solution, and adding it dropwise to ethanol. Strands of white solid polymer were observed when polymer had formed. Solvents employing this method included CH$_2$Cl$_2$ and toluene.

1-C: when the specified solvent dissolved norbornene and was a good solvent for polynorbornene formed via olefin metathesis, and the reaction was too fast to allow differentiation by method 1-B, the time to form a viscous solution, or, next, to form a "gel" (defined here as a reaction mixture too viscous to flow), or, next, to produce an exotherm (observable increase in reaction mixture temperature as a result of a negative free energy change upon polymerization) were measured.

Polymer yields were determined by removal of all volatile substances (solvent and unreacted monomer) under vacuum. Molecular weights of polymers so obtained were determined by gel permeation chromatography (GPC) using polystyrene standards.

Procedure 2

Same as Procedure 1, except that the reaction vessel was heated to the temperature indicated.

Procedure 3

Same as Procedure 1, except that some oxygen was remove from the polymerizable composition by the technique of bubbling nitrogen or argon through it, This technique does not remove significant amounts of water.

Procedure 4: Same as method 1, except the polymerizable composition was irradiated with an ultraviolet lamp with a primary output of 366 nm unless otherwise indicated (Spectroline Model EN-280L, Spectronics Corporation, Westbury NY; or Model UVGL-25 Mineralight® Lamp, Ultraviolet Products Incorporated, San Gabriel, CA, which can be used to irradiate at 366 or 254 nm; or two 15 watt Black Lights, BL or BLB, General Electric, Cleveland, Ohio or Phillips, Somerset, NJ or Sylvania/GTE, Exeter, NH) unless otherwise specified. Depending on solvent, polymer was observed by a method analogous to those described in Procedure 1, that is, a cloudy appearance due to precipitation from poor reaction solvent (4-A), precipitation from an aliquot in good solvent added to ethanol (4-B), or viscosity increase, gelation or exotherm (4-C).

Procedure 5

Same as Procedure 3, except that the polymerizable composition was irradiated with ultraviolet light (as in Procedure 4).

Departures from these procedures are indicated as appropriate.

EXAMPLE 1

This example demonstrates synthesis of (Ar)M-(N≡CR$^3$)$_2$X$^+$catalysts of the present invention.

The [($\eta^6$—C$_6$H$_6$)RuCl$_2$]$_2$ complex was prepared as in M.A. Bennett and A.K. Smith in *J. Chem. Soc., Dalton Trans.*, 1972, 233–241. This complex (0.50g, 1.00mmol) and a 1.0 molar CH$_3$CN solution of LIBF$_4$ (2.10 mL, 2.10mmol) were placed in 25mL of CH$_3$CN in an Erlenmeyer flask. No special precautions were taken to exclude air. The reddish suspension was stirred for 12h and was then filtered to remove a colorless precipitate. The orange filtrate was evaporated to a solid which was twice fractionally crystallized (by allowing ethyl ether to slowly diffuse into the CH$_3$CN solution of the product) to give 0.63g (82%) of [($\eta^6$—C$_6$H$_6$)RuCl(CH$_3$CN)$_2$]$^+$BF$_4$$^-$ as well formed orange prisms. Spectroscopic and elemental analyses confirmed the presence of the desired compound.

The [($\eta^6$—C$_6$H$_6$)RuCl$_2$]$_2$ complex (0.50g, 1.00 ol) and NH$_4$pF$_6$ (0.34g, 2.10mmol) were suspended in 25mL of CH$_3$CN and stirred 12h. Reaction work-up as above yielded 0.74g (84%) of [($\eta^6$—$C_6H_6$)RuCl(CH$_3$CN)$_2$]$^+$PF$_6^-$ as orange crystals. Spectroscopic and elemental analyses confirmed the presence of the desired compound.

The [($\eta^6$—$C_6H_6$)RuCl$_2$]$_2$ complex (0.50g, 1.00mmol) and KAsF$_6$ (0.48g, 2.10mmol) were reacted as above to give 0.88g 91%) of [($\eta^6$—$C_6H_6$)RuCl(CH$_3$CN)$_2$]$^+$AsF$_6^-$ as yellow-orange needles. Spectroscopic and elemental analyses confirmed the presence of the desired compound.

EXAMPLE 2

This example illustrates the use of one-part Group 9-containing catalysts.

[Ir(RO$_2$CHC=CHCO$_2$R)$_2$Cl]$_2$ wherein each R is ethyl or H, was prepared according to the method described for synthesis of Ir-2 by A. van der Ent, and A. L. Onderdelinden in *Inorganic Synthesis* 28, 90–92) using 0.5 g K$_3$IrCl$_6$ (hydrate), 7.5 mL H$_2$O, 2.5 mL 2-propanol, and 1.7 mL of diethyl maleate in place of cyclooctene, maintaining the reaction mixture under nitrogen at 70°–75° C. for 4 hr. A small portion of H$_2$O was added, and the water/propanol solution drawn off with a pipette. An oily residue remained, which spectroscopic and elemental analyses showed contained a small amount of unreacted diethyl maleate, some —CO$_2$H groups (from hydrolysis of ethyl ester) and some —CO$_2$Et groups and 19-20% by weight of iridium.

Two mg of this product was placed in 10 ML NB in ethyl acetate (Procedure 1), and resulted after 8 min in a polymer precipitate which entirely filled the reaction vessel and a noticeable exotherm. For comparison, an identical trial, but using as catalyst Ir-2, required 16 min to yield the same results.

Examples 3 and 4 illustrate the advantages of using terminal alkyne cocatalysts.

EXAMPLE 3

This example illustrates the use of terminal alkyne cocatalysts, using Procedure 1, with 5 mg Ru-1 in 10 mL NB, 25% by weight in CH$_2$Cl$_2$. Sample B contained 5 microliters phenylacetylene cocatalyst. The data is shown in Table A, below.

TABLE A

| | | Alkyne Cocatalysts | | | |
|---|---|---|---|---|---|
| Sample | Catalyst | Cocatalyst | Solvent | Method | Time to form polymer (min) |
| A* | Ru-1 | (none) | CH$_2$Cl$_2$ | 1-A | 15 |
| B | Ru-1 | PhC≡CH | CH$_2$Cl$_2$ | 1-A | 2 |

*comparative

The data of Table A show that polymerization is faster (Sample B faster than A) in the presence of terminal alkyne cocatalyst.

EXAMPLE 4

This example illustrates the use of terminal alkyne cocatalysts, with a method employing photolysis. Procedure 5 was used, with 25 mg Of W(CO)$_6$ catalyst, 1.0 g NB, and 2 mL solvent as indicated for Samples A to D, and 30 mg W(CO)$_6$ in 2 mL NBD (no solvent) for samples E to J. Polymerization rates were determined by measuring the time to form a gel. Sample A was not irradiated, and is presented for purposes of comparison. Sample B is also presented for purposes of comparison. The data is shown in Table B, below.

TABLE B

| | Terminal alkyne cocatalysts, with method employing photolysis | | | |
|---|---|---|---|---|
| Sample | Solvent | Cocatalyst | Yield, % | Time (min.) to gel |
| A$^a$* | CH$_2$Cl$_2$ | PhC≡CH | 0 | (no gel formed) |
| B* | CH$_2$Cl$_2$ | (none) | 50 | ≦200 |
| C* | CH$_2$Cl$_2$ | PhC≡CH | >95 | NM |
| D | toluene | PhC≡CH | 89 | NM |
| E | (none) | (none) | NM | 110 |
| F | (none) | PhC≡CH | NM | 25 |
| G | (none) | (4-tolyl)C≡CH | NM | 20 |
| H | (none) | (cyclohexyl)C≡CH | NM | <90 |
| I | (none) | (1-cyclohexenyl)C≡CH | NM | <90 |
| J | (none) | Bu$_3$SnC≡CH | NM | <90 |

*comparative
$^a$Sample A was not irradiated.

As can be seen from the data in Table B, Samples C and D, when compared to sample A which was not irradiated, showed that irradiation improved polymerization rates and yields. Samples C and D, when compared to sample B in which no cocatalyst is used, showed improved polymer yield. Samples F to J showed that the use of various terminal alkynes increased the rate of metathesis polymerization of cyclic olefin, compared to Sample E.

Examples 5 to 7 illustrate the advantages of using organosilane cocatalyst.

EXAMPLE 5

This example illustrates the effect of organosilane cocatalyst containing at least one silicon-bonded alkenyl group on catalyst activity and stability.

Procedure 1 was employed, with 10 mg of Ir-2 in 2.0 mL CH$_2$Cl$_2$. Immediately after preparation, 0.25 mL of this catalyst solution was added to 20.0 g monomer in CH$_2$Cl$_2$ and gel times (method 1-C) were measured. The trial was repeated 10 minutes after preparation of the catalyst solution and again 2 hours after preparation of the catalyst solution. The above described series of three experiments was repeated except that 28 mg of 1,3-bis(5-hexenyl)tetramethyldisiloxane (cocatalyst A) was added to the Ir-2 solution before use. The series was once again repeated as described except that 43 mg of 1,3,5,7-tetravinyltetramethylcyclotetrasiloxane (cocatalyst B) was added to the Ir-2 solution before use. The data is shown in Table C, below.

TABLE C

Gel times (in min) in the presence of organosilane cocatalyst containing C=C group

| Cocatalyst | Immediate | After 10 minutes | After 2 hours |
|---|---|---|---|
| none* | 3:00 | 3:30 | 25:00 |
| A | 5:00 | 5:00 | 7:30 |
| B | 2:00 | 2:00 | 2:00 |

*comparative

The data in Table C show that each of cocatalysts A and B stabilized the catalyst in solution. Cocatalyst B was a particularly effective stabilizer, and also increased catalyst activity, reflected in the shorter gel time, and was preferred in some applications.

EXAMPLE 6

This example illustrates the effect of organosilane cocatalyst containing at least one

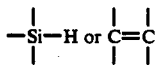

group on catalyst solubility.

Approximately 3 mL of $CH_2Cl_2$ was required to completely dissolve 3.1 mg of Ir-2. To test improvements in solubility, 20.6 mg Ir-2 was mixed with 0.4 mL $CH_2Cl_2$, but much material remained undissolved. Upon addition of 0.1 mL of 1,3-divinyltetramethyldisiloxane (DVTMDS) to the mixture, almost all Ir-2. compound material dissolved yielding a slightly turbid solution; the cocatalyst increased the solubility of the transition metal compound by a factor of approximately 40. Similar trials demonstrated improved solubility of catalysts in the presence of other organosilane cocatalysts as shown in Table D, below.

TABLE D

Solubility increase in transition metal catalysts with organosilane cocatalyst

| Catalyst | Cocatalyst | Solubility Increase |
|---|---|---|
| Ir-2 | DVTMDS | 40 |
| Ir-2 | 1,3,5,7-tetravinyltetramethylcyclo-tetrasiloxane | 20 |
| Ir-2 | pentamethyldisiloxane | 30 |
| Ir-1 | methylphenylsilane | 30 |
| Ir-1 | diethylsilane | ≧10 |
| Ir-1 | triethylsilane | ≧10 |

EXAMPLE 7

This example demonstrates that improved polymer yields and improved control over molecular weight can be provided by organosilane cocatalysts.

Procedure 1 employing $CH_2Cl_2$ as solvent was used. The data is shown in Table E, below.

TABLE E

Yield and molecular weight control achieved with organosilane cocatalyst

| Sample | Cat | Cocatalyst | Polymer[a] Yield % | $M_w$ |
|---|---|---|---|---|
| A[b*] | Ir-1 | (none) | 6 | 118 × 10^4 |
| B | Ir-1 | PhMeSiH_2 | 100 | 17.5 × 10^4 |
| C | Ir-1 | Et_2SiH_2 | 100 | 22.0 × 10^4 |

TABLE E-continued

Yield and molecular weight control achieved with organosilane cocatalyst

| Sample | Cat | Cocatalyst | Polymer[a] Yield % | $M_w$ |
|---|---|---|---|---|
| D | Ir-1 | Et_3SiH | 53 | 8.44 × 10^4 |

Notes:
[a]yield at 2 hr reaction time; $M_w$ is the weight average molecular weight
[b]not entirely homogeneous.
*comparative As the data in Table E show, higher yields of polymer It were obtained in the presence of organosilane cocatalyst. Molecular weights in the presence of organosilane cocatalyst were also lower. Formation of high molecular weight in an uncontrolled manner such as occurred in Sample A is undesirable because polymer solutions can be too viscous to handle.

Examples 8 to 12 illustrate the advantages of using oxidative cocatalysts.

EXAMPLE 8

This example demonstrates the enhanced rate of polymerization of ring-strained cyclic olefin in the presence of, as oxidative cocatalyst, ferricenium salt.

Following Procedure 1 with $CH_2Cl_2$ as solvent, each sample contained 5 mg of Ru-1 dissolved in 0.25 ml and 10 mL of monomer solution. Sample A contained no other additives. Sample B contained, in addition to the above, 0.5 mL gammabutyrolactone (GBL). Sample C additionally contained 3 mg $Cp_2Fe^+PF_6^-$ dissolved in 0.5 mL GBL (the iron salt is insoluble in $CH_2Cl_2$ alone). Sample D contained norbornylene solution and 4 rag $Cp_2Fe^+PF_6^-$ dissolved in 0.5 ml GBL, but no Ru-1. Samples were examined by method 1-A. The time to form polymer is indicated in Table F. Samples A, B, and D are presented for comparison. The data are shown in Table F, below.

TABLE F

Polymerization with Ru catalyst and ferricenium cocatalyst

| Sample | Catalyst | Time (min) to form Polymer |
|---|---|---|
| A* | Ru-1 | 15 |
| B* | Ru-1 + GBL | 26 |
| C | Ru-1 + $Cp_2Fe^+PF_6^-$ | 1 |
| D* | $Cp_2Fe^+PF_6^-$ | (no polymer at 37 min.) |

*comparative

The data in Table F demonstrated that the time to observe poly(norbornylene) in the presence of Ru-1 was shortened by at least an order of magnitude in the presence of ferricenium salt (Sample C), compared to Sample A or Sample B containing lactone (cyclic ester). The oxidative cocatalyst ferricenium salt was not, by itself, a catalyst (Sample D).

EXAMPLE 9

This example demonstrates the enhanced rate of polymerization in the presence of ferricenium salt for a Group 9-containing catalyst. Procedure 1 (and 1B) with $CH_2Cl_2$ solvent was used. The data are shown in Table G, below. Samples A and B are presented for comparison.

TABLE G

Group 9 catalyst with $Cp_2Fe^+PF_6^-$ cocatalyst

| Sample | $Cp_2Fe^+PF_6^-$ (mg) | GBL (total, ml) | Time (min) |
|---|---|---|---|
| A* | 0 | 0 | 2 |

TABLE G-continued

| | Group 9 catalyst with $Cp_2Fe^+PF_6^-$ cocatalyst | | |
|---|---|---|---|
| Sample | $Cp_2Fe^+PF_6^-$ (mg) | GBL (total, ml) | Time (min) |
| B* | 0 | 1.0 | 9 |
| C | 1 | 1.1 | 1 |

*Comparative
Note:
Procedure 1 with $CH_2Cl_2$ solvent, 1 mg of Ir-1 catalyst and 10 mL monomer solution. Polymer was observed by method 1-B.

As the data in Table G show, faster rates of polymerization were observed with ferricenium salt oxidative cocatalyst and Ir-1. GBL was added to Sample B to provide a convenient rate of reaction and more accurate comparison; the addition of GBL slows the rate of polymerization.

EXAMPLE 10

This example illustrates that various oxidative salt cocatalysts were useful with various transition metal catalysts, as shown in Table H, below.

TABLE H

| | Various catalysts with various oxidative salt cocatalysts | | | |
|---|---|---|---|---|
| Sample | Oxidative salt | Catalyst | Procedure | Time (method) |
| A* | (none) | Ir-1 | $1^a$ | 8 (1-B) |
| B | $Ph_3C^+PF_6^-$ | Ir-1 | $1^a$ | 1 (1-C, viscous) |
| C | $Ag^+PF_6^-$ | Ir-1 | $1^a$ | 1 (1-C, viscous) |
| D* | (none) | Ir-1 | $1^b$ | 30 (1-A, solids filled vial) |
| E | $Ag^+PF_6^-$ | Ir-1 | $1^b$ | 1 (1-A, solids filled vial) |
| F* | (none) | Ir-2 | $1^c$ | 120 (1-C, very viscous) |
| G | $Ag^+PF_6^-$ | Ir-2 | $1^c$ | <10 (1-C, gel) |
| H* | (none) | Ir-2 | $1^b$ | 17 (1-A, exotherm) |
| I | $Na^+SbF_6^-$ | Ir-2 | $1^b$ | 9 (1-A, exotherm) |
| J | $Zn^{2+}(BF_4^-)_2$ (hydrate) | Ir-2 | $1^b$ | 3 (1-A, exotherm) |
| K | $Zn^{2+}$(acetate$^-$)$_2$ (dihydrate) | Ir-2 | $1^b$ | 14 (1-A, exotherm) |
| L | $Cu^{2+}(BF_4^-)_2$ (45% in $H_2O$) | Ir-2 | $1^b$ | 5 (1-A, exotherm) |
| M* | (none) | Ru-1 | $1^b$ | 16 (1-A, low yield) |
| N | $Zn^{2+}(BF_4^-)_2$ | Ru-1 | $1^b$ | 8 (1-A, good yield) |

*comparative
Notes:
$^a$Procedure 1 in $CH_2Cl_2$ solvent with 1.0 ml BL, 1 mg Ir-1 and 1 mg of the indicated oxidant.
$^b$Procedure 1 in ethyl acetate solution.
$^c$Procedure 2, with 5-norbornen-2-yl acetate monomer in ethyl acetate solution at 60° C.

The data in Table H show faster rates of polymerization for the indicated catalysts (Ir-1, Ir-2, Ru-1) and oxidative salt cocatalysts, as compared to the rates in the absence of cocatalyst. A comparison of Samples B and C to Sample A (no cocatalyst), a comparison of Sample E to Sample D (no cocatalyst), and a comparison of Sample G to Sample F (no cocatalyst) shows that use of a cocatalyst greatly increased the speed of polymerization. Note that in E and F an estersubstituted monomer was used. Similarly, a comparison of Samples I to L to Sample H (no cocatalyst), and a comparison of Sample N to Sample M (no cocatalyst) show increased speed of polymerization when a cocatalyst was used. Note that Samples D to N all contain organic-functional group in the solvent (ethyl acetate).

EXAMPLE 11

This example illustrates the use of oxidative cocatalysts with Group 6-containing metal catalysts, also employing the use of photolysis.

Following Procedures 3 and 5, each sample contained $W(CO)_6$ as catalyst, tris(4-bromophenyl)aminium hexachloroantimonate cocatalyst ("aminium" in Table I, below), and NB at 50% by weight in toluene solvent.

TABLE I

| | Oxidative cocatalysts with Group 6-containing catalysts | | |
|---|---|---|---|
| Sample | Method | Cocatalyst | Yield, % |
| A | 3 (60° C., no light) | aminium | 15 |
| B | 5 (light) | aminium | 87 |

Comparison of samples A and B showed improved yields of polymer obtained with oxidative cocatalyst and photolysis.

EXAMPLE 12

This example illustrates the use of oxidative cocatalysts containing oxygen to non-oxygen double bond. Data are presented in Table J, below.

TABLE J

| | Various catalysts with various oxidative cocatalysts containing oxygen to non-oxygen double bond | | | |
|---|---|---|---|---|
| Sample | Oxidative cocatalyst | Catalyst | Procedure | Time (method) |
| A* | (none) | Ir-1 | $1^a$ | 8 (1-B) |
| B | p-benzoquinone | Ir-1 | $1^a$ | 3 (1-B) |
| C | benzophenone | Ir-1 | $1^a$ | 2 (1-B) |
| D* | (none) | Ir-3 | $1^b$ | 420 (1-B) |
| E | $Me_3NO$ | Ir-3 | $1^b$ | 4 (1-B) |

*Comparative
Notes:
$^a$$CH_2Cl_2$ solvent with 1.0 ml GBL, 1 mg Ir-1 and 1 mg of the indicated oxidant.
$^b$2.0 mg of Ir-3 in 12.1 g of NB, 25% in ethanol.

The data in Table J show that faster rates of polymerization were observed when oxidative cocatalystcontaining oxygen to non-oxygen double bond was employed. This can be seen in comparison of Samples B and C to Sample A, and comparison of Sample E to Sample D.

Examples 13 and 14 demonstrate the advantages of using heteroatom-containing alkene cocatlysts.

EXAMPLE 13

This example demonstrates the use of heteroatom-containing alkene, and a method employing photolysis in one step of a two-step process.

Using Procedure 3, a sample containing 0.183g $W(CO)_6$, 0.037 g ethyl vinyl ether cocatalyst, and 15 ml 1,2-dichloroethane was prepared and irradiated for 20 min, during which time a light yellow color developed. A 3 ml aliquot of the irradiated solution was put into a separate vessel containing 5 g of degassed norbornadiene under nitrogen and in the dark. Within 15 minutes (in the dark), a highly swollen polynorbornadiene gel was obtained. Isolated was 0.081 g of solid polymer.

EXAMPLE 14

This example demonstrates the use of heteroatom-containing alkene with Group 8 and Group 9 transition metalcontaining compounds.

Each sample was prepared according to Procedure 1. Polymerization rates, yields and/or molecular weights were measured, and are presented in Table K, below.

TABLE K

| | | Heteroatom-containing Alkene Cocatalysts | | | | | |
|---|---|---|---|---|---|---|---|
| Sample | Catalyst | Cocatalyst | Solvent | Method | Rate | Yield | $M_w \times 10^{-4}$ |
| A* | Ru-1 | (none) | $CH_2Cl_2$ | 1-C | >322 | 17 | 44.8[a] |
| B | Ru-1 | pyran[b] | $CH_2Cl_2$ | 1-C | 240 | 56 | 25.2[a] |
| C* | Ru-1 | (none) | $CH_2Cl_2$ | 1-B | 15 | | |
| D | Ru-1 | furan | $CH_2Cl_2$ | 1-B | 10 | | |
| E | Ru-1 | pyran[c] | $CH_2Cl_2$ | 1-B | 5 | | |
| F | Ru-1 | 2,5-dihydrofuran | $CH_2Cl_2$ | 1-B | 10 | | |
| G | Ru-1 | 3-tmscp[d] | $CH_2Cl_2$ | 1-B | 5 | | |

Notes:
[a] weight average molecular weight.
[b] 0.2 g 3,4-dihydro-2-H-pyran per 30 mg Ru-1.
[c] 0.1 g 3,4-dihydro-2-H-pyran per 30 mg Ru-1.
[d] 0.1 g 3-trimethylsilylcyclopentene per 30 mg Ru-1.

A comparison of samples A and B in Table K shows that the use of heteroatom-containing alkene cocatalyst provided faster rates of polymerization, higher polymer yields, and better control over molecular weight of the polymer obtained. Comparison of samples D-G to sample C shows that faster polymerization rates were achieved with heteroatomcontaining alkenes.

Examples 15 to 17 illustrate the advantages of methods employing photolysis.

EXAMPLE 15

This example demonstrated the method employing photolysis for a polymerizable composition containing a one-part catalyst (no cocatalyst), and no solvent. The sample contained 0.020 9 $W(CO)_6$ and 5.00 g NB, melted to dissolve the catalyst, and purged with nitrogen in a vial which was then sealed. The sample was irradiated for 30 min at 50° C. (in the melt), and then kept at 50° C. without irradiation for an additional 16 hours. The thick, viscous liquid in the vial was submitted for $^1H$ and $^{13}C$ NMR (Nuclear Magnetic Resonance spectroscopy), which showed it to be predominately the cis form of polynorbornadiene (by comparison to published spectra of K. J. Ivin, D. T. Laverty and J.J. Rooney, *Makromol. Chem.* 1977, 178, 1545–1560). An identical sample, kept at 50° C. for 16 hours without irradiation, showed only norbornylene by $^1H$ and $^{13}C$ NMR.

This example demonstrates that a polymerizable composition containing one-part catalyst and cyclic olefin can be caused to polymerize by a method employing photolysis. It is particularly advantageous that, in this example, polymerization does not occur in the absence of photolysis, that is, it is possible to prevent polymerization of a polymerizable composition until a desired time, and then to initiate or trigger the polymerization by photolysis.

EXAMPLE 16

The example demonstrates the use of various one-part and two-part catalysts containing Group 6 transition metal compounds, which showed greater activity when photolysis was employed. The data is shown in Table L below for one-part catalysts. The data for two-part catalysts was presented in Tables B and I, above.

TABLE L

| Sample | Catalyst | Solvent | Cocatalyst | Method | Yield, % |
|---|---|---|---|---|---|
| A* | $W(CO)_6$ | $CH_2Cl_2$ | (none) | 3 | 0 |
| B | $W(CO)_6$ | toluene | (none) | 5 | 50 |

TABLE L-continued

| Sample | Catalyst | Solvent | Cocatalyst | Method | Yield, % |
|---|---|---|---|---|---|
| C* | $W(CO)_6$ | $CH_2Cl_2$ | (none) | 5 | 74 |
| D* | $Mo(CO)_4(NBD)$ | $CH_2Cl_2$ | (none) | 3 | a |
| E* | $Mo(CO)_4(NBD)$ | $CH_2Cl_2$ | (none) | 5 | a |
| F* | $Mo(CO)_6$ | $CH_2Cl_2$ | (none) | 5 | 50 |
| G* | (mesitylene)-$W(CO)_3$ | $CH_2Cl_2$ | (none) | 5 | a |

*comparative
[a] Not measured, but sufficient yield to provide material for spectroscopic analysis, ≧5%.

The data in Table L show that polymer yields were higher when photolysis was employed with a one-part catalyst (Sample B compared to A).

The data in Table B above (Sample D compared to A) show increased polymer yields and rates upon photolysis in the presence of terminal alkyne cocatalyst. In Table I, above, Sample B (irradiated) gave a higher polymer yield than Sample A (dark) in the presence of oxidative salt cocatalyst.

EXAMPLE 17

This example demonstrates the use of various one-part catalysts containing Group 7 and Group 8 transition metalcontaining compounds. Samples were prepared and times to form polymer measured, with results shown in Table M, below.

TABLE M

| | One-part Group 8 and Group 9 catalysts | | | |
|---|---|---|---|---|
| Sample | Catalyst | Solvent | Method | Time to form polymer (min) |
| A | Ru-2 | $EtOH/H_2O$ | 1-A (dark) | 120 |
| B | Ru-2 | $EtOH/H_2O$ | 4-A (light) | 5 |
| C* | $RuCl_3$ (hydrate) | $EtOH/H_2O$ | 1-A (dark) | 120 |
| D* | Ru-1 | EtOH | 1-A (dark) | 60 |
| E | Ru-1 | EtOH | 4-A (light) | 7 |
| F* | Ru-1 | $CH_2Cl_2$ | 1-B (dark) | 9 |
| G | Ru-1 | $CH_2Cl_2$ | 4-B (light) | 6 |
| H* | $Re_2(CO)_{10}$ | $CH_2Cl_2$ | 1-A (dark) | >60 |
| I | $Re_2(CO)_{10}$ | $CH_2Cl_2$ | 4-A (light) | 30 |

*comparative

In Table M, a comparison of samples A and B (which are the same except that B was irradiated as were samples E, G and I), of D and E, of F and G, and of H and I, shows that rates of polymerization were faster when samples were irradiated. Sample C using commercial $RuCl_3.xH_2O$ is presented for purposes of comparison to the background art; greater amounts of precipitate were formed in sample C than in sample A in 2 hr, that is, Ru-2 is slower than $RuCl_3$ unless irradiated (sample B).

In some processes, large differences between dark and irradiated rates may be preferred.

EXAMPLE 18

This example demonstrates the formation of a self-supporting sheet-like article using polymerizable compositions of the present invention.

Twenty-one mg of Ir-1 was placed in 4.6 g CH$_2$Cl$_2$. Et$_2$SiH$_2$ (39 mg) was added, and the Ir compound dissolved. 5.51 g of dicyclopentadiene (which had been stored over alumina for approximately 16 hr to remove colored impurities) was added. A portion of this sample was poured into a pan to produce a liquid film of less than 1 Mm thickness. The pan was then heated to 100° C. Within 5 min, a solid had formed, and was peeled from the pan to produce a self-supporting sheet. The sheet was sufficiently flexible and tough that it could be handled and manipulated without particular care, that is, it was not fragile nor very brittle.

Various modifications and alterations of this invention will become apparent to those skilled in the art without departing from the scope and spirit of this invention, and it should be understood that this invention is not to be unduly limited to the illustrative embodiments set forth herein.

We claim:

1. A polymerizable composition comprising
   a) at least one ring-strained non-conjugated cyclic olefin, and
   b) a one-part transition metal-containing catalyst which is air and moisture stable, said catalyst being selected from the group consisting of cationic organometallic Ru and Os-containing salts having at least one polyene ligand.
2. The composition according to claim 1 wherein said transition metal in said transitionmetal containing catalyst is Os.
3. The composition according to claim 1 wherein said transition metal is Ru.
4. The composition according to claim 1 wherein said cyclic olefin is norbornene or substituted norbornene.
5. A method for polymerizing ring-strained cyclic olefins comprising the steps of:
   a) providing the composition as disclosed in claim 1, and
   b) allowing said composition to polyermize.
6. The polymerized composition according to claim 1.
7. The composition according to claim 1 wherein said polyene ligand is cyclic.
8. The composition according to claim 1 wherein said polyene ligand is acyclic.
9. The composition according to claim 1 wherein said catalyst comprises a cation having the formula $$(Ar)M(N{=}CR^3)_2X^+$$

wherein
   Ar is benzene or any of the alkyl, ether, or formate substituted benzenes, M is ruthenium or asmium, X is a halogen.
10. The composition according to claim 1 wherein said catalyst comprises a cation having the formula $$(Ar)M(Py)_2X^+$$

wherein
   Ar, M, and X are as defined previously, and Py is pyridine or substituted pyridine.
11. The composition according to claim 1 wherein said catalyst comprises a cation having the formula $$(Ar)M{-}(\mu{-}Y)_3{-}M(Ar)^+$$

wherein
   Ar and M are as defined previously, Y is selected from the group consisting of Cl, Br, I, H, OH, and ER$^4$ where R$^4$ is a linear or branched hydrocarbon chain with 1 to 30 carbon atoms or an aromatic group containing 6 to 20 carbon atoms and E is oxygen (O) or sulfur (S).
12. The composition according to claim 1 wherein said catalyst comprises a cation having a formula selected from the group consisting of
   (CHT(RuCl(CH$_3$CN)$_2$+$^1$
   (Ar)Ru(CH$_3$CN)$_3$+$^2$
   CpRu(CH$_3$CN)$_3$+$^1$
   (COD)RuX(CH$_3$CN)$_3$+$^1$
wherein CHT is cycloheptatriene, Ar is as defined previously, Cp is eta$^5$-cyclopentadienyl, and COD is 1,5-cyclooctadiene.
13. The method according to claim 5 wherein said polymerization step takes place in the presence of at least one of heat and actinic radiation.
14. The method according to claim 13 wherein said polymerization step takes place in the presence of heat.
15. The method according to claim 13 wherein said polymerization step takes place in the presence of actinic radiation.
16. A self-supported sheet-like article comprising the polymerized composition according to claim 6.
17. A molded article comprising the polymerized composition according to claim 6.
18. A coated article comprising the composition according to claim 6.

* * * * *

UNITED STATES PATENT AND TRADEMARK OFFICE
CERTIFICATE OF CORRECTION

PATENT NO. : 5,296,566

DATED : March 22, 1994

INVENTOR(S) : Katherine A. Brown-Wensley et al.

It is certified that error appears in the above-indentified patent and that said Letters Patent is hereby corrected as shown below:

On the Title Page, "[75] Inventors", "Fred B. McCormic" should read -- Fred B. McCormick --.

On the Title Page, "[75] Inventors", delete "Michael C. Palazzotto, William M. Lamanna, Larry D. Boardman, and John E. Gozum" as inventors.

Col. 1, line 28, "Saecjusa" should read -- Saegusa --.

Col. 1, line 68, "compound, organic" should read -- compound. Organic --.

Col. 2, line 45, "IrCl$_3$.H$_2$O" should read -- IrCl$_3 \cdot$H$_2$O --.

Col. 3, line 58, "presence Of" should read -- presence of --.

Col. 3, lines 57-58, "trans-2-pentene" should read -- *trans*-2-pentene --.

Col. 4, line 30, "(c$_1$ to C$_4$)" should read -- (C$_1$ to C$_4$) --.

Col. 4, line 52, "a is" should read -- a --.

Col. 5, line 58, "*organotransition*" should read -- *Organotransition* --.

Col. 5, line 59, "science" should be -- Science --.

Col. 6, line 57, "heteroatoms-containing" should read -- heteroatom-containing --.

UNITED STATES PATENT AND TRADEMARK OFFICE
CERTIFICATE OF CORRECTION

PATENT NO. : 5,296,566
DATED : March 22, 1994
INVENTOR(S) : Katherine A. Brown-Wensley et al.

It is certified that error appears in the above-indentified patent and that said Letters Patent is hereby corrected as shown below:

Col. 7, lines 1-2, "endo or exo or svn or anti" should read -- *endo or exo or syn or anti* --.

Col. 7, line 34, "*organometallic*" should read -- *Organometallic* --.

Col. 9, line 10, "mo or w" should read -- Mo or W --.

Col. 9, line 21, "(Ar)M(N=CR$^3$)$_2$X$^+$" should read -- (Ar)M(N≡CR$^3$)$_2$X$^+$ --.

Col. 9, line 22, "format" should be -- formate --.

Col. 9, line 23, "pars-xylene" should be -- para-xylene --.

Col. 9, line 28, "R3" should be -- R$^3$ --.

Col. 9, line 29, "linear branched" should be -- linear or branched --.

Col. 9, line 29, "I to 30" should be -- 1 to 30 --.

Col. 9, line 34, "1974" should be -- 1972 --.

Col. 9, line 64, "m atoms" should be -- M atoms --.

Col. 10, line 6, "Ru i or" should be -- Ru or --.

Col. 10, line 9, "cationic,," should be -- cationic, --.

Col. 10, line 34, "selenited" should be -- selected --.

Col. 11, line 30, "rates df" should be -- rates of --.

UNITED STATES PATENT AND TRADEMARK OFFICE
CERTIFICATE OF CORRECTION

PATENT NO. : 5,296,566
DATED : March 22, 1994
INVENTOR(S) : Katherine A. Brown-Wensley et al.

It is certified that error appears in the above-indentified patent and that said Letters Patent is hereby corrected as shown below:

Col. 12, line 14, "*organosilane*" should read -- *Organosilane* --.

Col. 12, lines 64-65, "No$^+$, No$^+$" should be -- NO$^+$, NO$_2^+$ --.

Col. 13, line 41, "*organotransition*" should be -- *Organotransition* --.

Col. 13, line 46, "heteroatomcontaining" should be -- heteroatom-containing --.

Col. 13, line 48, "heteroatoms-containing" should be -- heteroatom-containing --.

Col. 14, line 12, "1-pyrrolidino-i-cyclohexene" should be -- 1-pyrrolidino-1-cyclohexene --.

Col. 14, lines 50-51, "(7-oxabicyclo[2.2.]hept-5-ene)" should read -- (7-oxabicyclo[2.2.1]hept-5-ene) --.

Col. 15, line 23, "exceed.20" should read -- exceed 20 --.

Col. 16, line 34, "(bicyclo[2.2.]hept-2-ene)" should read -- (bicyclo[2.2.1]hept-2-ene) --.

Col. 16, line 37, "after "Ru-1=" insert -- [Ru(cymene)Cl$_2$]$_2$ --; then immediately preceding "[(C$_6$H$_6$)Ru(CH$_3$CN)$_2$Cl]$^+$PF$_6^-$" insert -- Ru-2= --.

UNITED STATES PATENT AND TRADEMARK OFFICE
CERTIFICATE OF CORRECTION

PATENT NO. : 5,296,566
DATED : March 22, 1994
INVENTOR(S) : Katherine A. Brown-Wensley et al.

It is certified that error appears in the above-indentified patent and that said Letters Patent is hereby corrected as shown below:

Col. 16, line 64, "in H" should be -- in $H_2O$ --.

Col. 17, line 6, "15 wt t" should be -- 15 wt % --.

Col. 17, line 7, "platinum(O)" should be -- platinum(0) --.

Col. 17, line 15, "and.2 g" should be -- and 2 g --.

Col. 17, line 44, "254" should be -- 25% --.

Col. 18, line 21, "through it," should be -- through it. --

Col. 18, line 54, "LIBF$_4$" should be -- $LiBF_4$ --.

Col. 18, line 66, "(0.50g, 1.00 ol)" should be -- (0.50g, 1.00mmol) --.

Col. 18, line 67, "NH$_4$pF$_6$" should be -- $NH_4PF_6$ --.

Col. 19, line 7, "0.88g 91%)" should be -- 0.88g (91%) --.

Col. 19, lines 7-8, $[(\eta^6-C_6H_6)RuCl(CH_3CN)_2]^{+AsF6-}$" should be -- $[(\eta^6-C_6H_6)RuCl(CH_3CN)_2]^+AsF_6^-$ --.

Col. 19, line 63, "25 mg Of" should be -- 25 mg of --.

Col. 20, line 21-37, delete the second occurrence of "Table B".

Col. 20, line 58, "$CH_2Cl_2$and" should be -- $CH_2Cl_2$, and --.

UNITED STATES PATENT AND TRADEMARK OFFICE
CERTIFICATE OF CORRECTION

PATENT NO. : 5,296,566
DATED : March 22, 1994
INVENTOR(S) : Katherine A. Brown-Wensley et al.

It is certified that error appears in the above-indentified patent and that said Letters Patent is hereby corrected as shown below:

Col. 21, line 34, "Ir-2.compound" should be -- Ir-2 compound --.

Col. 22, line 13, "It" should be deleted.

Col. 22, line 33, "4 rag" should be -- 4 mg --.

Col. 23, line 62, "estersubstituted" should read -- ester-substituted --.

Col. 24, lines 43-44, "cocatalystcontaining" should read -- cocatalyst-containing --.

Col. 25, line 24, "heteroatomcontaining" should read -- heteroatom-containing --.

Col. 25, line 33, "0.020 9" should be -- 0.020 g --.

Col. 26, line 42, "metalcontaining" should be -- metal-containing --.

Col. 27, line 39, "transitionmetal" should be -- transition-metal --.

Col. 28, line 10, "asmium" should be -- osmium --.

UNITED STATES PATENT AND TRADEMARK OFFICE
CERTIFICATE OF CORRECTION

PATENT NO. : 5,296,566
DATED : March 22, 1994
INVENTOR(S) : Katherine A. Brown-Wensley et al.

It is certified that error appears in the above-indentified patent and that said Letters Patent is hereby corrected as shown below:

Col. 28, line 34, "(CHT(RuCl)(CH$_3$CN)$_2{}^{+1}$" should read -- (CHT)RuCl(CH$_3$CN)$_2{}^{+1}$ --.

Signed and Sealed this

Twenty-fifth Day of October, 1994

Attest:

BRUCE LEHMAN

Attesting Officer

Commissioner of Patents and Trademarks